United States Patent [19]

Licht et al.

[11] Patent Number: 4,575,384

[45] Date of Patent: Mar. 11, 1986

[54] GRINDING WHEEL FOR GRINDING TITANIUM

[75] Inventors: Robert H. Licht, Hudson; Charles V. Rue, Petersham, both of Mass.

[73] Assignee: Norton Company, Worcester, Mass.

[21] Appl. No.: 615,847

[22] Filed: May 31, 1984

[51] Int. Cl.$^4$ .............................................. B24D 3/02
[52] U.S. Cl. .................................... 51/308; 51/293; 51/298
[58] Field of Search .......................... 51/293, 308, 298

[56] References Cited

U.S. PATENT DOCUMENTS

| | | | |
|---|---|---|---|
| 2,194,472 | 3/1940 | Jackson | 51/298 |
| 2,216,728 | 10/1940 | Benner et al. | 51/298 |
| 3,156,545 | 11/1964 | Kistler et al. | 51/298 |
| 3,175,894 | 3/1965 | Foot | 51/298 |
| 3,183,071 | 5/1965 | Rue et al. | 51/298 |
| 3,535,832 | 10/1970 | Amero | 51/308 |
| 4,311,489 | 1/1982 | Kressner | 51/308 |
| 4,364,746 | 12/1982 | Bitzer et al. | 51/298 |

*Primary Examiner*—Paul Lieberman
*Assistant Examiner*—Willie J. Thompson
*Attorney, Agent, or Firm*—Arthur A. Loiselle, Jr.

[57] ABSTRACT

An abrasive product and process is disclosed, for grinding titanium metal and its alloy. The product used to grind the titanium consists of a grinding wheel wherein the abrasive grains are aggregates of silicon carbide particles bonded together with a refractory bond such as silicon oxynitride or a silicate based material.

8 Claims, No Drawings

GRINDING WHEEL FOR GRINDING TITANIUM

TECHNICAL FIELD

The invention relates to grinding wheels and in particular resin bonded grinding wheels.

BACKGROUND AND INFORMATION DISCLOSURE STATEMENT

The following publications are representative of the most relevant prior art known to the Applicants at the time of filing of the application.

| UNITED STATES PATENTS | | |
|---|---|---|
| 2,194,472 | March 26, 1940 | G. H. Jackson |
| 2,216,728 | October 8, 1940 | R. C. Benner et al |
| 3,183,071 | May 11, 1965 | C. V. Rue et al |
| 4,364,746 | December 21, 1982 | D. Bitzer et al |

Of the many metals and alloys of commercial importance, titanium metal and its alloys have been the most troublesome to process at various stages of fabrication into a finished product. One of the most serious problem areas is the grinding of titanium and its alloys. Titanium is an extremely difficult material to machine and grind. Titanium is highly susceptible to oxidation i.e. it's very reactive with oxygen, especially at elevated temperatures such as those created during grinding of the metal. The oxidation reaction is highly exothermic thereby generating a substantial amount of heat which is additive with the normal heat of grinding experienced grinding any metal. To compound the problem titanium has a relatively low thermal conductivity as compared with the ferrous metals which results in a greater concentration of heat at the grinding surface.

This high concentration of heat at the grinding surface, i.e. the interface between the grinding wheel and the metal being ground, raises havoc with the grinding wheel or other abrasive tool being used. If the abrasive product's bond is an organic polymer as would be found most likely in a snagging wheel or a coated abrasive product, this extreme thermal condition will cause premature thermal decomposition of the organic polymer bond, resulting in costly high abrasive product usage. In addition, the high temperature and highly chemically reactive environment accelerates wear of the abrasive being used, particularly if the abrasive is an oxide based abrasive such as alumina or cofused alumina-zirconia. Besides these thermally caused problems, snagging of titanium involves relatively high grinding forces. The mechanism of shear of titanium results in a higher force and a thinner chip per unit depth of cut as compared to ferrous metals; this naturally results in higher sliding speed and higher unit forces on the abrasive grains. Lower grinding speeds required by the thermal conditions inherent in the grinding of titanium create higher shear stresses during grinding.

To the present time, the grinding of titanium still remains an undesirably expensive step in the fabricating of titanium parts. The most effective abrasive grain for the conditioning of titanium is a cofused alumina-zirconia abrasive containing about 25% by weight of zirconia; its reasonable success is due to its superior toughness as compared to all other abrasives. However, because it is an oxide, the alumina-zirconia abrasive is very susceptible to reaction with the titanium at the heat of grinding. Conventional crystalline silicon carbide is also effective in grinding titanium as long as the grinding operation does not require high grinding pressure or forces; in this case the silicon carbide single crystal abrasive grains are too weak to perform efficiently. The silicon carbide does have the advantage of being resistant to dissolution in the hot titanium because it is not an oxide.

While the foregoing is the current status of the abrasives used to grind titanium, there are other types of abrasives known in the industry but not known to have been used successfully in grinding titanium.

U.S. Pat. No. 2,194,472 discloses an abrasive wherein each abrasive grain is not a single crystal or particle but rather is an agglomeration or aggregate of a number of relatively small abrasive particles bonded together. Specifically, as it relates to the present invention, the reference teaches bonding 50 and/or 280 grit silicon carbide abrasive with a clay by mixing the two materials, firing at 1250° C. to vitrify the clay, cooling the mass and finally breaking up the mass and screening the particles to the desired size. The aggregate particles are then used to make a coated abrasive product. There is no discussion with respect to how the coated abrasive product is to be used, except by implication in that the article is an abrasive articles.

Prebonded abrasive aggregates are taught by U.S. Pat. No. 2,216,728 wherein the aggregates are made up of a plurality of smaller grains of diamond or boron carbide held in the aggregate by a bond which may be a metal, clay, glass or an organic polymer. The method of formation of the aggregates will vary slightly depending on the nature of the bonding medium employed. If metal is the bond then the metal powder and fine abrasive particles, e.g. diamond, are mixed together and hot pressed at a temperature of from 700° to 1500° depending on the metal used. If the abrasive is diamond the hot pressing is done in an non-oxidizing atmosphere. Ceramic bonded aggregates are made by mixing about 5% clay with 95% fine abrasive grain with the usual liquid to give the mixture the needed consistency. The mix is then fired at for example 1250° to vitrify the clay bond. After cooling, the bond mass is broken up into the desired particle size; these particles are then bonded into a grinding wheel with additional bond usually of a different type than the bond used to form the aggregates.

A heavy duty snapping abrasive is disclosed in U.S. Pat. No. 3,183,071 which is made up of bonded particles of very fine crystalline alumina having a particle size of less than 5 microns. Abrasive pellets of various cross sections are formed by extruding mixtures of fine alumina particles and a bond, cutting the extrudate at the desired size, and firing the green pellets. The bond is a silicate glass which has a final fired weight composition of 10–25% alumina, 50–70% silica, 5–15% calcia, 10–20% magnesia, and up to about 3% impurities. The fired pellets are bonded into a grinding wheel and use to snag grind stainless steel.

U.S. Pat. No. 4,364,746 adds a further variant to the technology of agglomerated abrasive grain. Prebonded abrasive aggregates in this case, are made up of fine particles of an abrasive material such as alumina or silicon carbide bonded into the larger abrasive particles by a resin or polymer. Aggregate particles of different strengths are made by incorporating various types and amounts of filler materials in the resin or polymer binder used to hold the fine abrasive particles together to form the larger abrasive agglomerates. In addition to incorporating fillers in the fine grain binder, the properties of the final aggregate are also varied by using different amounts and different types of resin as the binder. These aggregates of various strengths are blended in a given coated abrasive product or grinding wheel to give a particular desired end result.

The disclosed abrasive aggregates are also utilized with the more conventional type abrasive grains such as fused crushed alumina, alumina-zirconia and the like, including silicon carbide, boron carbide and diamond.

DISCLOSURE OF THE INVENTION

It has been found that titanium and alloys of titanium can be more effectively ground with coated abrasives or grinding wheels wherein the abrasive is made up granules of finer silicon carbide particles which are bonded together with an inorganic binder. The binder for the silicon carbide particles can be essentially any inorganic mineral or compound which will function as such e.g. clays, silicon nitride, glasses and the like. Especially suitable are silicon oxynitride and the iron silicates. The silicon carbide particles can vary in size from about 4620 microns (8 mesh U.S. Standard Sieves) to about 32 microns (325 mesh U.S. Standard Sieves) and finer i.e. the bonded silicon carbide aggregate may contain particles which are all one mesh size e.g. 100 mesh, but the aggregate may contain a mixture of mesh sizes. This is particularly true when all the silicon carbide particles are relatively fine. A typical particle size distribution would be, based on U.S. Standard Sieve Series as are all the screen or sieve sizes referred to herein unless otherwise identified, as follows:

| Screen Size | Wt. Percent |
|---|---|
| 8 | 4 |
| 12 | 9 |
| 25 | 29 |
| 100 | 35 |
| 325 | 11 |
| −325 | 12 |

The foregoing is a particle size distribution that provides an excellent general purpose aggregate type silicon carbide grain. However, depending on the specific titanium alloy being ground, the makeup of the aggregate abrasive grain can be modified to provide optimum results. The amount of bond can be varied between 5% and 20% by weight of the grain and the particle size of the particles of silicon carbide which go into the aggregate can be varied widely but are preferably within the following ranges:

| Screen Size | Wt. Percent |
|---|---|
| 8 | 1-6 |
| 12 | 4-14 |
| 25 | 25-35 |
| 100 | 31-41 |
| 325 | 7-18 |
| −325 | 7-19 |

If the abrasive product utilizing the aforedescribed abrasive grain is a grinding wheel, then the wheel may be any of the so-called resinoid or organic polymer bonded wheels in any specification, i.e. any grade, structure number and grit size of the abrasive grain. The wheel may be bonded with such organic polymers as phenol-aldehyde condensation resins, polyurethane resins, epoxy resin, polyester resins, polyimide resins and polybenzimidazoles. In addition to the organic resin, the bond may also contain any of the myriad of so-called fillers and/or grinding aids which are well known in the grinding wheel art. The volume percent composition of the grinding wheel should be from 40-60% abrasive grains, 12-60% combined resin and filler, and 0-28% pores. In most case active fillers or grinding aids will be desirable. Halogen containing compounds such as polyvinylidene chloride are especially advantages. When fillers are incorporated in the bond they would preferably make up from 5% to 80% of the total bond.

If the grinding product or tool is a coated abrasive type, all of the coated abrasive prior art is useable within the context of the present invention. The usual paper or cloth backings can be used in combination the maker coat and size coat materials one of more of which may incorporate an active filler and especially halogen containing fillers such as cryolite, polyvinylidene chloride, potassium fluoroborate and the like.

It has also been found that the inorganic bonded aggregate abrasive described herein can be used to advantage in combination with more conventional abrasives such as crushed cofused alumina-zirconia abrasive containing 25-50% by weight of zirconia. Whether or not such a mixture of abrasive grains is advantageous would depend on several factors such as the particular titanium alloy to be ground and the grinding conditions; the more extreme the grinding conditions become, the more advantageous it is to incorporate a tough abrasive such as an alumina-zirconia type despite the fact that the latter abrasive is a dual oxide based material. Up to 50-75% by volume of such a crushed cofused abrasive can be used to advantage.

EXAMPLES OF THE PREFERRED EMBODIMENTS

Two types of inorganic bonded aggregate silicon carbide abrasive were prepared as follows:

About 11 kg of silicon carbide having a particle size distribution as set out above, were mixed with 8% silicon, about 1% calcium cyanamide, 1% dextrim and about 5% water, all by weight percent. The mixture was then placed in a mold and a plate or batt measuring 45.7 cm×45.7 cm×1.9 cm was pressed in a hydraulic press under a pressure of about 2.5-3 tons per square inch. The plate was dried overnight at 200° C. and then fired in an atmosphere of air at 1450° C. After firing the plate was cooled and broken up and crushed to the desired abrasive grain sizing. The resulting abrasive grain was a plurality of silicon carbide particles bonded together basically by a silicon oxynitride bond which does include some silica.

A second type of aggregate abrasive was formed using the same method as in the silicon oxynitride bonded aggregate but in this case about 13 kg of silicon carbide were mixed with about 1% iron oxide instead of the silicon and calcium cyanamide. The final material was a silicon carbide aggregate bonded with an iron silicate bond.

The two aggregate abrasive described above, ZS ALUNDUM a 25% zirconia abrasive manufactured by Norton Co., and 37 CRYSTOLON a single crystal or monolithic silicon carbide abrasive grain manufactured by Norton Co., were used to make several sets of organic bonded grinding wheels which were used to grind titanium under various grinding conditions. All of the wheels were identical, except for the abrasive, and had the following volume percent composition:

| Material | Volume % |
|---|---|
| abrasive grain, 16 mesh | 58.00 |
| phenol-formaldehyde resin Reichold 29318 | 23.56 |
| powdered silicon carbide filler (−325 mesh) | 9.12 |
| polyvinylidene chloride | 2.28 |
| powdered quick lime (CaO) | 3.04 |
| chopped fiberglass | 4.00 |

Conventional hot-pressed snagging wheels utilizing alumina-zirconia abrasive were made measuring 12 inches (30.48 cm) in diameter by 0.5 inch (1.27 cm) thick with a 4.88 inches (12.38 cm) hole were made by placing 9.00 pounds (4.08 kg) of 16 mesh abrasive, depending on the density of the abrasive, into a vertical spindle mixer. To the abrasive was added 19.2 cc of furfural which functioned as a pick-up agent for the bond. To the wetted abrasive grain was added 2.68 pounds (1.22 kg) of bond which was made up of 1.10 pounds (0.50 kg) of two stage phenol-formaldehyde resin, 1.07 pounds (0.49 kg) of the fine silicon carbide filler, 0.15 pounds (0.07 kg) of polyvinylidene chloride, 0.36 pounds (0.16 kg) of the lime. Then 0.37 pounds (0.17 kg) of chopped glass fibers were added. The materials were blended until uniformly mixed. 5.89 pounds (2.67 kg) of this mix was placed in a conventional steel mold set up with a 12 inch I.D. and 4.88 inch (12.38 cm) arbor. The top plate was put in place and the mix was hot-pressed at a pressure of 5100 psi (35 N/mm$^2$) and a temperature of about 160° C. for 1 hour. The wheel was removed from the mold and further cured in a mechanically convected oven for 24 hours at 200° C.

Identical sets of wheels were made employing the two experimental abrasives and standard silicon carbide in the same manner. The weight formulations were of course adjusted, from the above weight formulation, for the differences in abrasive densities.

All of the wheels were used to grind titanium utilizing a 50 horsepower Massab cut-off machine plunge grinding 2.25 inch (5.72 cm) square titanium bars to a depth of 1.25 inches (3.18 cm). Two or three wheels of each abrasive type were subjected to two breakin runs which were followed by five test plunges at 1000 pounds (453.6 kg) force on the grinding head; the two wheels of each variation were averaged and it is these averages which appear in the tabulated data below. The same wheels were subjected to a second test which was identical except the force on the grinding head was 500 pounds (226.8 kg).

Table I shows a comparison, under both grinding pressures of grinding head force levels, of commercial alumina-zirconia abrasive containing 25% zirconia, a commercial crystalline (i.e. single particle) abrasive, and the invention aggregate abrasive utilizing silicon oxynitride as the bond for the relatively fine silicon carbide particles. All of the abrasives were 16 mesh (U.S. Standard Sieve Series). The grinding results in Table I (and all subsequent tabulations) are recording in terms of relative material rate, relative wheelwear rate and relative G-ratio, all being relative to these values for the heretofore superior prior art alumina-zirconia abrasive. G-ratio is the metal removal rate divided by the wheelwear rate as is customary in the art, G-ratio being a measure of the quality of the wheel. The use of relative values of G-Ratio, and the other parameters in the following tables, while simplifying the evaluation of these values, does obscure the fact that the absolute values at 1000 lbs. force are not the same as those absolute values at 500 lbs. force.

TABLE I

| Abrasive | Grinding Force (lbs) | Wheel-Wear | Metal Removal | G-Ratio |
|---|---|---|---|---|
| Alumina-Zirconia | 1000 | 100 | 100 | 100 |
|  | 500 | 100 | 100 | 100 |
| Standard Silicon Carbide | 1000 | 163 | 123 | 77 |
|  | 500 | 70 | 145 | 205 |
| Invention Abrasive | 1000 | 119 | 106 | 89 |
|  | 500 | 44 | 129 | 238 |

The invention abrasive is superior to standard silicon carbide at both levels of grinding force while compared to alumina-zirconia it is inferior at the higher grinding force but vastly superior at the lower grinding force.

The two invention abrasives, i.e. the silicon carbide particles bonded with silicon oxynitride (I) and those bonded with iron silicate (II), were compared to each other and to the standard commercial alumina-zirconia and silicon carbide abrasives in the same type of grinding test using the same grinding conditions with the following results.

TABLE II

| Abrasive | Grinding Force (lbs) | Wheel-Wear | Material Removal | G-Ratio |
|---|---|---|---|---|
| Alumina-Zirconia | 1000 | 100 | 100 | 100 |
|  | 500 | 100 | 100 | 100 |
| Stnd. Silicon Carbide | 1000 | 192 | 146 | 75 |
|  | 500 | 64 | 143 | 224 |
| I | 1000 | 112 | 104 | 92 |
|  | 500 | 37 | 124 | 331 |
| II | 1000 | 115 | 93 | 82 |
|  | 500 | 38 | 123 | 319 |

These results show that both types of invention abrasive are equivalent to one another under both grinding force levels, slightly superior to the standard silicon carbide and slightly inferior to the standard alumina-zirconia abrasives at the higher grinding force, but at the heat generating lower grinding force the two invention abrasives were vastly superior to both silicon carbide and alumina-zirconia.

It was also found that by mixing 50% alumina-zirconia and 50% invention abrasive bonded with silicon oxynitride the very poor performance of alumina-zirconia at 500 pounds (226.8 kg) is greatly enhanced almost to the level of the wheels containing all experimental abrasive. The same mixture of abrasives had little effect at the higher level of grinding force.

TABLE 3

| Abrasive | Grinding Force (lbs) | Wheel-Wear | Metal Removal | G-Ratio |
|---|---|---|---|---|
| Alumina-Zirconia | 500 | 100 | 100 | 100 |
| Stnd. Silicon Carbide | 500 | 70 | 137 | 196 |
| Invention Abrasive/Alumina-Zirconia | 500 | 70 | 171 | 247 |

The abrasive mixture may include up to about 75% of the alumina-zirconia crushed cofused type abrasive.

What is claimed is:

1. A process for grinding titanium metal and its alloys, characterized by:
   applying to the surface of said metal, a moving abrasive product comprised of abrasive grains and a bond therefor wherein said abrasive grains are each made up of a plurality of silicon carbide particles bonded together by an inorganic binder wherein said inorganic binder is one selected from the group consisting of silicon oxynitride and iron silicate.

2. The process of claim 1 wherein said abrasive grains are made up from 80% to 95% by weight of silicon carbide particles, 5% to 20% by weight of inorganic binder therefor, and wherein said silicon carbide particles can vary in size from about 4620 microns to about 32 microns and finer.

3. The process of claim 1 wherein said resin bond includes fillers and said resin is selected from the group consisting of phenol-aldehyde condensation resin, epoxy resin, polyester resin, polyimide resin, and polybenzimidazole resin.

4. The process of claim 3 wherein said grinding wheel consists essentially of 40% to 60% by volume of said abrasive grains, 12% to 60% by volume of combined resin and filler, and 0% to 28% by volume of pores.

5. The process of claim 1 wherein said abrasive product is a coated abrasive comprising a flexible backing to which said abrasive grains are affixed with a thermoset organic polymer.

6. The process of claim 1 wherein said abrasive grains include up to 75% by weight of alumina-zirconia crushed cofused abrasive.

7. An abrasive grain especially suitable for grinding titanium and titanium alloys, said abrasive grain being made up of a plurality of silicon carbide particles bonded together by a substantially lesser amount of a bond selected from the group consisting of silicon oxynitride and iron silicate.

8. The abrasive of claim 7 wherein said silicon carbide particles are present in an amount of from 80% to 95% by weight, the silicon oxynitride or iron silicate is present in an amount of from 5% to 20% by weight, and said silicon carbide has a particle size of from about 4620 microns to about 32 microns and finer.

* * * * *